March 26, 1940.  E. E. GUINNESS  2,195,246
FLUID TRANSMISSION APPARATUS
Filed Oct. 12, 1935   3 Sheets-Sheet 1

Edward Ewart Guinness
INVENTOR
By his ATTY.

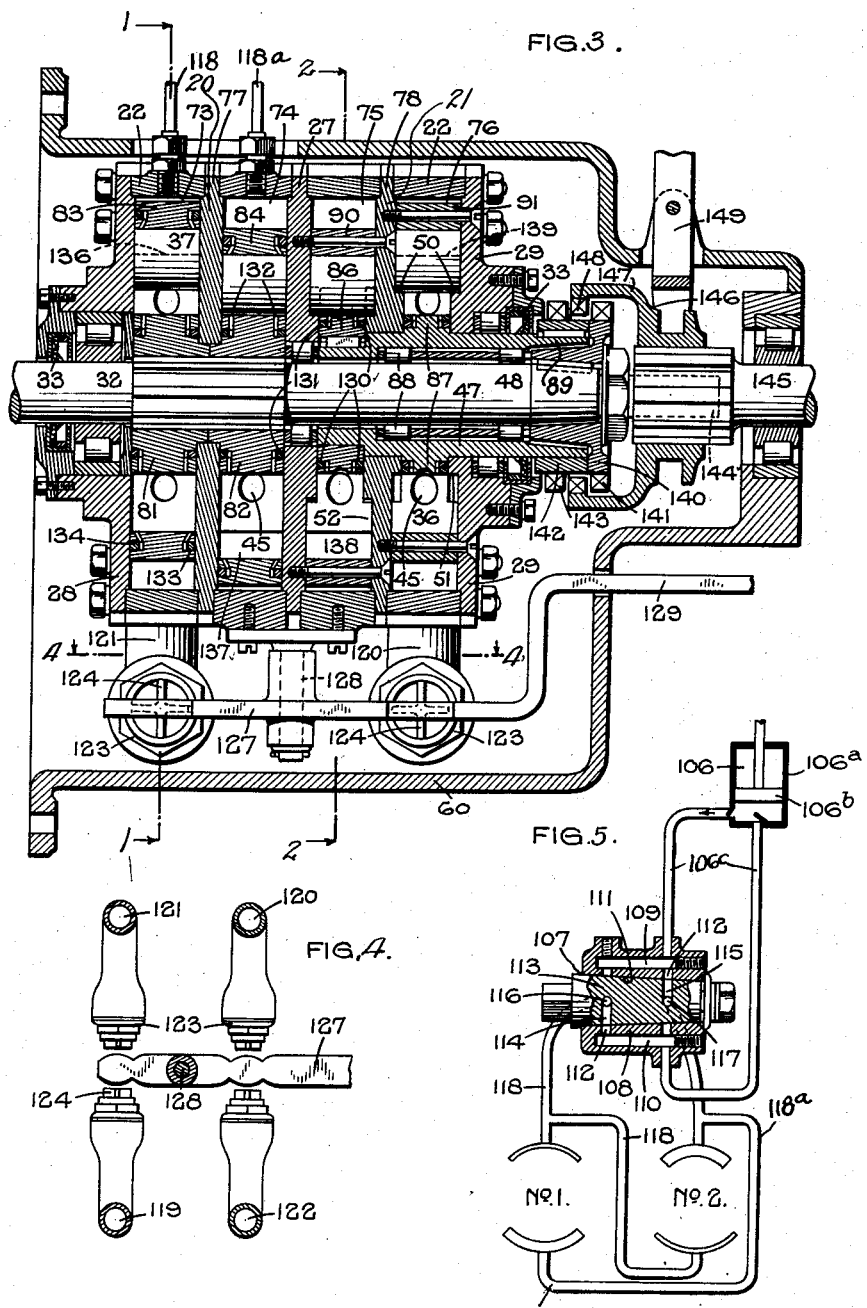

FIG. 5ª.

Edward Ewart Guinness
INVENTOR

Patented Mar. 26, 1940

2,195,246

UNITED STATES PATENT OFFICE 2,195,246

FLUID TRANSMISSION APPARATUS

Edward Ewart Guinness, Wolverhampton, England, assignor to Fluvario, Limited, West Bromwich, England, a company of Great Britain Application October 12, 1935, Serial No. 44,642
In Great Britain October 17, 1934

3 Claims. (Cl. 60—53)

This invention relates to fluid transmission apparatus for transmitting power from a driving to a driven member, and refers to that type of apparatus which comprises a rotary pump unit and a rotary motor unit, the pump and motor units each including a stator and a rotor, the latter being associated respectively with the driving and driven members, and means being provided for varying the power transmitted from the driving to the driven member.

Such units are described and claimed per se in Patent No. 2,159,941, issued May 23, 1939.

One of the objects of the present invention is to provide a generally improved construction of such apparatus which possesses a particularly high efficiency.

A further object is to construct such apparatus in a compact form and particularly suitable for use upon mechanically propelled vehicles.

Other objects will be apparent from the following description of the apparatus.

Referring to the drawings:

Figures 1 and 2 are part sectional views on the lines 1—1 and 2—2 respectively of Figure 3 illustrating a form of fluid transmission apparatus particularly suitable for use on mechanically propelled vehicles and constructed in accordance with the present invention.

Figure 3 is a sectional side elevation on the line 3—3 of Figure 1, some of the vanes of the transmission apparatus being removed.

Figure 4 is a sectional view on the line 4—4 of Figure 3.

Figure 5 is a diagrammatic view illustrating the arrangement of the mechanism for controlling this construction of fluid transmission apparatus.

Figure 5a is a perspective view of part of the same construction.

In the construction illustrated in Figures 1 to 7 of the drawings, the transmission apparatus comprises a pump unit constructed as a rotary pump shown generally at 20 and a motor unit constructed as a vane motor shown generally at 21, and the pump and motor are arranged side by side and disposed within a common housing, both the pump and the motor being divided into two sections, the two pump sections 73, 74 being disposed adjacent one another at one end of the housing, and the two motor sections 75, 76 being similarly adjacent at the opposite end of the housing.

For convenience in description, the pump sections 73 and 74 will be referred to as No. 1 and No. 2 pump sections respectively, while the motor sections 75 and 76 will be referred to as No. 1 and No. 2 motor sections respectively.

Figure 1:
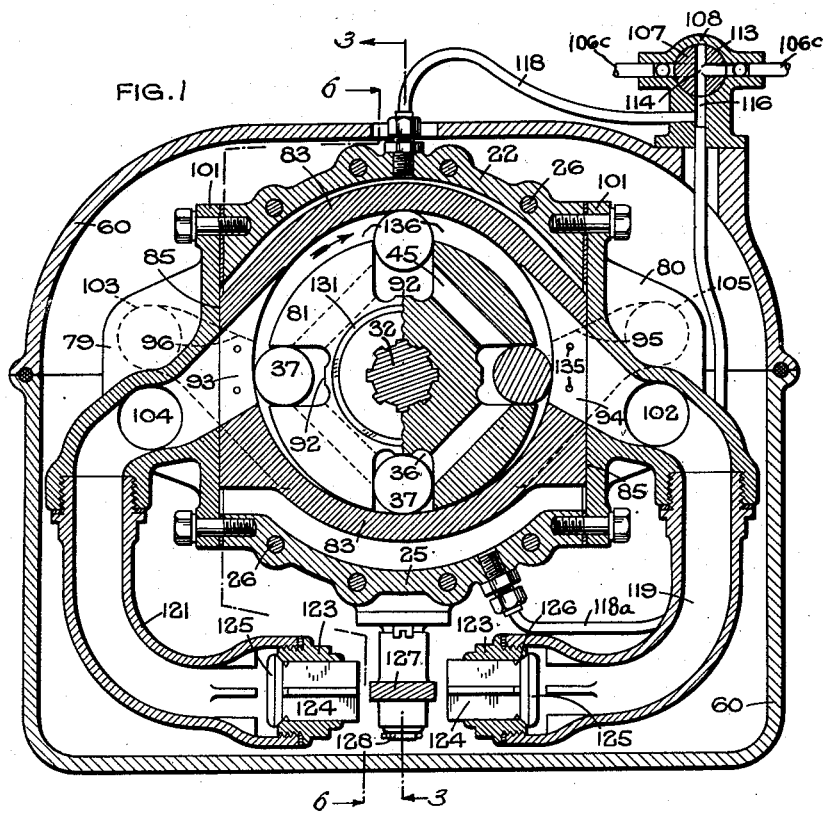
Figure 2:
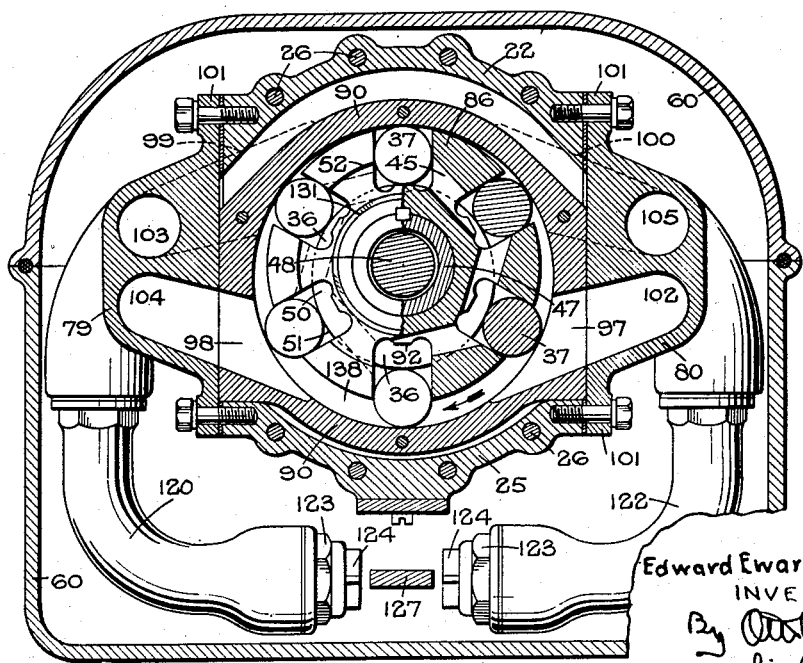

Further, that side of the apparatus which is to the right in Figures 1 and 2 will be referred to as the front side, the side opposite thereto being termed the rear side.

The housing includes a central partition plate 27 which serves to separate the pump from the motor and end plates 28, 29, the individual pump and motor sections being separated by division plates 77 and 78 respectively of a configuration similar to that of the partition plate 27.

The housing is provided with four pairs instead of two pairs of side members 22, and these are disposed in a horizontal instead of a vertical position above and beneath the pump and motor, while openings are provided in the vertical sides of the housing for the detachable reception of transfer members 79, 80 which serve to close these sides and also to transfer fluid from the pump to the motor and vice versa in a manner to be hereinafter described.

The apparatus is provided with a main driving shaft 32 supported rotatably from the housing, and each pump section is provided with a rotor 81, 82 of annular cylindrical form, the two rotors being conveniently splined to the shaft 32.

The periphery of each pump rotor is formed with four longitudinally extending recesses 36 of U or channel form in cross section arranged symmetrically around the rotor, and slidably and rotatably mounted in each of these recesses is a vane 37 constructed as a roller or like member of cylindrical form, and conveniently each of the vanes and also the pump rotor extends for the full distance between the opposed faces of the plates 27, 77 and 28.

Each pump section is provided with a stator 83 and 84 of annular form disposed around the corresponding pump rotor 81, 82 and having an internal diameter somewhat greater than the external diameter of the rotor, and the front and rear sides of each stator are formed with vertical plane faces 85 which engage slidably corresponding faces formed on the adjacent surfaces of the two transfer members so that each stator can be slid in a vertical direction from a position in which it is eccentric in relation to its rotor, until it is concentric thereto, and again finally eccentric.

Conveniently, under normal conditions of working the stator 83 of No. 1 pump section is disposed with its axis above the central axis of the driving shaft 32, while the stator 84 of No. 2 pump section has its axis disposed below the driving shaft axis.

Conveniently, the stator rotor and vanes of each pump section are of similar configuration and dimensions, while the direction of rotation of the driving shaft 32 is conveniently clockwise when viewed in Figure 1.

The pump vanes 37 fit the sides of their recesses 36 sufficiently loosely to insure that during the rotation of the pump rotors fluid is forced under pressure into the base of the vane recesses to maintain the vane in contact with the interior of the stator.

In order to equalize the pressure distribution within the recesses, adjacent recesses are connected by tangential pressure equalizing passages 45.

With such an arrangement, during the rotation of the pump rotor, the engagement between the vanes and the interior of the stator is purely a rolling one, so that wear on the vanes and on the interior of the stator is reduced.

The rotors 86, 87 of each of the motor sections are mounted upon a driven sleeve 47 supported rotatably both from the plates 27, 78, 29 and also from an extension 48 of the driving shaft through the medium of an elongated roller bearing 88.

It is preferred, however, to construct the rotor 86 of No. 1 motor section separately from this sleeve, and to make it of annular form, while the rotor 87 of No. 2 motor section is formed integrally with the sleeve 47.

Conveniently, the driven sleeve 47 is provided with an annular extension 89 which projects beyond the motor end plate 29.

Each motor rotor is of the same diameter as that of the pump rotors, and the motor rotors are provided with longitudinal recesses of a form similar to the recesses of the pump rotors, and are provided with vanes again similar to the pump vanes, but it is preferred to provide each motor rotor with six vanes instead of four as in the case of the pump, in order firstly that a more even torque shall be applied to the driven sleeve, and secondly that this sleeve shall be driven at a maximum speed somewhat greater than that of the driving shaft.

Each motor vane has a length equal to that of the pump vanes so that the speed of rotation of the driven sleeve is comparable to that of the driving shaft, but if desired the length of the motor vanes may be substantially greater than, or substantially less than, the length of the pump vanes according to whether it is desired that the speed of the driven sleeve shall be less than or greater than that of the driving shaft.

Each motor section is provided with one of a pair of motor stators 90, 91, and it is preferred to mount these in a stationary manner, the stator 90 of No. 1 motor section being disposed with the central axis below the central axis of the driving shaft and driven sleeve mounted thereon, the stator 91 of No. 2 motor section having its axis disposed a similar distance above the central axis of such sleeve.

To maintain the motor vanes positively in abutment with the interior of their respective stators, the partition plate 27, and both the division plate 78 and motor end plate 29 are provided on their opposed faces with integral cams 50 the outer faces 51 of which cams are adapted to engage the ends of the motor vanes.

Owing to the fact that during rotation of the motor rotor a certain sliding movement must occur between the vanes on either the interior of the motor stator or the cam faces, it is preferred to maintain the vanes out of actual contact with the latter by disposing the cam faces 51 at a distance from the interior of the stator slightly greater than the diameter of the vanes, and to provide means similar to that of the pump rotor for maintaining the vanes in contact with the motor stator and out of engagement with the cam faces by fluid under pressure within the vane recesses. The above arrangement of the cams 50 is shown more clearly in Figure 5a.

In such a construction in order to prevent, during the operation of the apparatus, fluid from passing through the recesses beneath the ends of the vanes, the opposite sides of the peripheral portions of each motor rotor are provided between the ends of each of the vanes with integral arcuate flanges 52, the ends of which abut the adjacent faces of the plates 27, 78 and 29.

The base of each vane recess of both the pump and motor is plane, and provided centrally with a longitudinally extending projection 92 which forms a wearing surface for engaging the vanes when these are in their innermost position with respect to their rotors.

Conveniently, the normal direction of rotation of the motor rotors is like that of the pump rotors, clockwise when the apparatus is viewed from the pump end thereof.

The front and rear side of each pump stator is provided with a pump suction or a pump delivery port, the suction and delivery ports 93, 94 of No. 1 section pump being preferably disposed at the rear and front side thereof respectively, and the suction and delivery ports 95, 96 of No. 2 section pump being disposed at the front and rear side thereof respectively, and in order that sudden changes in the direction of the path of the fluid may be avoided as far as possible with resultant reduction in hydraulic losses, the two ports of No. 1 section pump are disposed with their axes inclined upwardly towards the interior of the pump, the axes of the ports of No. 2 section pump being similarly inclined downwardly thereof so that in both pump sections, as will be apparent from Figure 1, the path of the fluid is tangential to the surface of the two pump rotors, and sudden changes in direction are avoided.

Conveniently the width of the ports in a longitudinal direction is substantially less than the length of each stator, so that the stator surface with which the pump vanes engage is continuous. The front and rear side of each motor stator is provided similarly with a motor inlet or a motor exhaust port, the inlet and exhaust ports 97, 98 of No. 1 section motor being disposed in the front and rear side respectively of the stator thereof, while the inlet and exhaust ports 99, 100 of No. 2 section motor are formed respectively in the rear and front side of the stator of this motor section.

In order to ensure that the path of the fluid impinging upon and leaving each motor rotor shall be free from sudden changes in direction, as in the case of the pump, the axes of the inlet and exhaust ports of No. 1 motor section are inclined downwardly in a direction towards the rotor thereof, the axes of the inlet and exhaust ports of No. 2 motor section being inclined similarly in an upward direction.

It is preferred to provide the apparatus with two separate fluid circuits, No. 1 pump section and No. 1 motor section forming one circuit, and No. 2 pump section and No. 2 motor section forming the other circuit.

Figure 7:
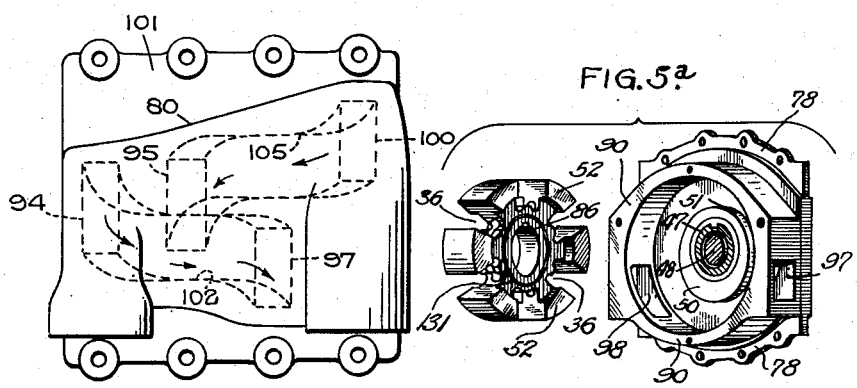
Figure 7 is a side elevation of this transfer member.

For connecting the ports of these pump and motor sections respectively together, the transfer members 79, 80 which are conveniently each formed as a hollow casting and provided with a peripheral flange 101 for bolting them on to the adjacent face of the housing, are each formed internally with a pair of parallel circular passages disposed vertically above each other and extending longitudinally of the apparatus, the ends of which terminate in openings of similar configuration to, and which form extensions of the ports of the pump or motor as the case may be, the general shape of the passages being indicated in Figure 7, the lower passage 102 of the transfer member 80 serving as a pressure passage or chamber and connecting the delivery port 94 of No. 1 pump section to the inlet port 97 of No. 1 motor section, and the upper passage 103 of the transfer member 79 serving again as a pressure passage or chamber connecting the delivery port 96 of No. 2 section pump to the inlet port 99 of No. 2 section motor.

Similarly, the lower passage 104 of the transfer member 79 serves as a suction passage or chamber for connecting the exhaust port 98 of No. 1 motor section to the inlet port 93 of No. 1 pump section, while the upper passage 105 of transfer member 80 serving as a suction passage or chamber connecting the exhaust port 100 of No. 2 motor section to the suction port 95 of No. 2 pump section.

With the two pump stators in the positions indicated, fluid is admitted from the suction chamber of No. 1 section pump and motor through the suction port of No. 1 pump section, is forced to the delivery port thereof, and under considerable pressure into the pressure chamber of No. 1 section pump and motor, passing therefrom through No. 1 section motor inlet port, and finally through the exhaust port of this motor back to the suction chamber. A similar cycle occurs in the case of No. 2 section pump and motor, a continuous circulation of the fluid being set up in both cases, while by arranging the ports and the pressure and suction chambers in the manner described, sudden changes in the direction of the fluid are avoided and hydraulic losses are reduced to a minimum.

The power output of the apparatus may be varied by sliding one or both of the pump stators in relation to their respective rotors into a position in which they are more or less concentric in respect thereto, no power being transmitted from the pump to the motor when both stators are concentric relative to their rotors.

Again, by sliding the stators beyond this concentric position, the direction of movement of the fluid through the pump is reversed, the fluid being sucked into each pump section through the delivery port thereof, ejected from the suction ports thereof into the suction passages 104, 105 which thus become pressure chambers from which the fluid, again in a reverse direction, is forced under pressure through the motor exhaust ports, so that the direction of rotation of the motor is reversed in relation to that of the pump, the fluid finally passing out of the motor through the motor inlet ports to the pressure passages 102, 103 which now become pressure chambers, and so back to the pump. By this means a reverse drive may be obtained.

One form of control means for varying the position of each pump stator in relation to its rotor is illustrated in Figure 5, and this is of the fluid operated or hydraulic type, comprising a source of fluid pressure and suction, indicated diagrammatically at 106, conveniently comprising a cylinder 106a having a piston 106b slidable therewithin, and connected by fluid pressure and suction pipes 106c to a control valve of rotary type, shown generally at 107.

Conveniently, this valve comprises a horizontal casing 108 provided at opposite sides with pressure and suction chambers 109, 110 respectively, and connected by suitable pipes to the cylinder.

The casing 108 is provided centrally with a valve seating 111 of frusto-conical form, and opposite sides thereof are provided with axially spaced supply ports 112 which extend radially from the valve seating.

Rotatably mounted within the seating is a valve member 113 of frusto-conical form provided with a pair of ports 114 and 115 of T configuration as will be apparent from Figure 1, and these T-shaped ports are spaced axially by a distance equal to the axial spacing between the ports 112 and are arranged opposite thereto.

Disposed vertically beneath the axis of rotation of the valve member are further ports 116, 117 similarly spaced axially, the port 116 being in communication with the space above the upper side of No. 1 section pump stator, and also with the space beneath No. 2 section pump stator, the port 117 being similarly in communication with the space beneath No. 1 section pump stator and with the space above No. 2 section pump stator, suitable pipes 118, 118a being provided for this purpose.

The T shaped ports 114, 115 of the valve member are arranged at 180° with respect to each other, so that the legs of these T shaped ports extend in opposite directions, and with the valve member 113 in the position indicated in Figures 1 and 5, the port 117 is in communication with the source of fluid pressure, so that the stators of No. 1 and No. 2 sections of the pump are subjected to equal amounts of fluid at the same pressure, and forced respectively in an upward and a downward direction through equal distances, the upper and lower sides of these stators respectively being in communication with the source of fluid suction.

On rotating the valve through 180°, the reverse condition obtains, and the positions of the two stators may be reversed.

The whole apparatus is enclosed within an outer casing 60 which is filled partially with the oil or other fluid, serving again as a reservoir for such fluid, and to ensure that each pump and motor circuit shall be maintained completely filled with the fluid, each of the transfer members 79, 80 are provided with a pair of fluid supply passages 119, 120, 121, 122 communicating respectively with the passages 102, 103, 104, 105 of these transfer members, and these supply passages are conveniently formed as downwardly extending elbows, the lower ends of the elbows of opposite transfer members being opposed and extending horizontally towards each other so that they are disposed beneath the housing 25 and adjacent the bottom of the casing 60.

The lower end of each of the elbows is provided with a cylindrical valve guide 123 within each of which is slidably mounted a horizontal valve 124, conveniently of the disc type, comprising a disc 125 adapted to engage an annular seating 126 formed on the inner end of each of the valve guides so that each valve is moved automatically into the closed position by fluid pressure within the passages 119 to 122.

Figure 6:
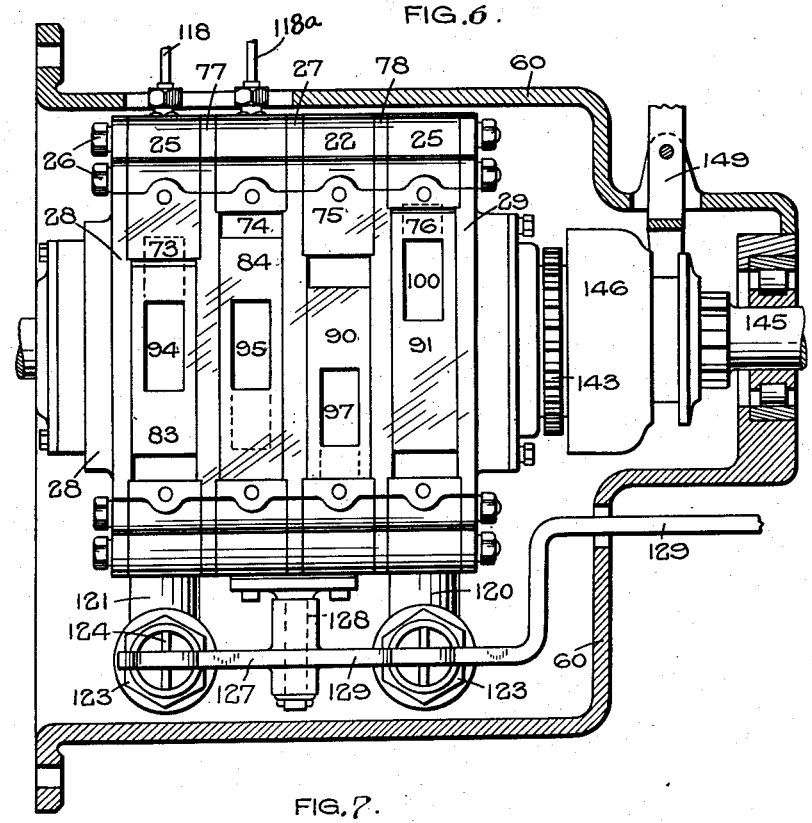
Figure 6 is a side view of the same construction on the line 6—6 of Figure 1, illustrating the arrangement of the ports of the transmission apparatus, one of the fluid transfer members being removed for this purpose.

For operating the valves there is provided a horizontal lever 127 mounted pivotally upon a vertical pivot 128 carried by the lower side of the housing and disposed symmetrically with respect to the four valves, as is evident from Figure 4, and one end 129 of this lever is of cranked configuration, as shown in Figure 6, and projects through an opening provided in the casing 60, the free end of this projection being extended and connected to a suitable control lever of known type, and is adapted, on movement in a clockwise direction viewed in Figure 4, to open the valves associated with the passages 121, 122 communicating with the suction chambers 104, 105 respectively, and to permit of the valves and the passages 119, 120 communicating with the pressure passages 102, 103 being closed automatically by the pressure of the fluid therewithin so that no fluid is forced under pressure into the casing.

When, however, the control gear is operated to move the two stators into the reverse position so that the pressure chambers 102, 103 become suction chambers, and the suction chambers 104, 105 become pressure chambers, the arm 127 is moved in an anti-clockwise direction when viewed in Figure 4 to open the valves associated with the passages 119, 120 to permit of fluid being sucked therein and to allow of the valves associated with the passages 121, 122 being closed automatically by the fluid pressure within the communicating suction passages.

In order to prevent fluid from leaking between the end faces of the rotors and the adjacent faces of the division plates, end plates and partition plate, these rotor faces may be provided adjacent the inner ends thereof with annular recesses 130 within which are mounted slidably annular sealing members 131 adapted for engagement with the surface of the adjacent plate.

In order to maintain the annular sealing members 131 in engagement with the adjacent plate, the base of each annular recess is provided with a plurality of passages 132 communicating each with the base of one of the pump motor vane recesses as the case may be, so that during the inward movement of a vane in relation to its motor, fluid under pressure is forced into the base of the appropriate annular recess so that the sealing members are maintained in close abutment with the plates.

Similar recessses and sealing members are provided in the two end faces of each pump stator, and these recesses and sealing members, indicated generally at 133 and 134 respectively, may be provided in the two end faces of each pump stator, and these recesses and sealing members may extend entirely and continuously around their stators, and in order to maintain the sealing members in abutment with the faces of the adjacent plates, the bases of the recesses may communicate with the pump delivery ports by means of passages 135 indicated in Figure 1.

By spacing the two stators of the pump by equal distances above and below the axis of rotation of the driving shaft, by arranging the pump ports so that the suction port of one pump section is on the side of the apparatus opposite to the suction port of the other section, and by making the two sections identical in every respect so that equal quantities of fluid under the same head are admitted simultaneously to each of the pump sections, the working sections or spaces 136 and 137 of each pump section are of equal size and are disposed at the same distance on opposite sides of the driving shaft, while the same amount of work is done by the pump vanes upon the fluid in each section, the same fluid head being in each case produced so that resultant transverse thrust upon the driving shaft and between the two rotors, shaft, and bearings therefor in a direction transverse to the direction of rotation of the two pump rotors is substantially eliminated, while similarly by disposing the motor stators by equal distances above and below the driven sleeve, and by making each motor section of similar dimensions, the same amount of work is done in each of the motor working sections or spaces 138, 139 which are disposed at equal distances from, and at opposite sides of, the driven sleeve, so that resultant transverse thrust between the latter and the bearings therefor is similarly substantially eliminated, so that wear of the bearings supporting the driving shaft and driven sleeve is reduced, the whole apparatus being in fact mechanically and hydraulically balanced so that considerable reduction in wear of the apparatus as a whole is obtained.

The above described particular form of transmission apparatus is particularly suitable for use upon mechanically propelled vehicles in place of the existing gear boxes, and under such circumstances it is desirable that the apparatus should be capable of transmitting a direct drive to the Cardan or propeller shaft of the vehicle.

For this purpose the extension 48 of the driving shaft carries adjacent the annular extension 89 of the driven sleeve a circular direct drive clutch member 140 keyed thereto and provided with a plurality of peripheral direct drive clutch dogs 141, while non-rotatably mounted upon the extension 89 of the driven sleeve is a variable drive clutch member 142 of annular form having a plurality of peripheral variable drive clutch dogs 143 spaced longitudinally of the clutch dogs 141 towards the motor end of the apparatus.

The extension 48 of the driving shaft is provided with a spigotted end 144 which engages rotatably within an opening provided in the front end of the adjacent propeller shaft 145 of the vehicle, and this end of the propeller shaft carries a movable clutch member 146 slidably mounted on splines provided on this shaft, and having an integral annular hollow portion 147 which extends towards the motor, the free end of this portion having inwardly projecting clutch dogs 148 adapted to be disposed between the variable drive clutch dogs 143 and the direct drive clutch dogs 141 adapted on sliding movement of the movable clutch member to place the propeller shaft in alternate driving engagement with the motor rotors or with the driving shaft 32, so that a variable or a direct drive can be obtained. With the movable clutch member in the position indicated, no drive is transmitted to the propeller shaft.

For controlling the position of the movable clutch member, the casing 60 carries a suitable control lever 149 of known type.

By arranging for the driven sleeve to be rotated at a speed somewhat greater than that of the driving shaft, the drive can be readily changed from variable to direct, since it will be found that during the sliding movement of the movable clutch member, on disengaging the latter from the variable drive clutch dogs, its speed will fall slightly until on engaging the direct drive clutch dogs it has a speed corresponding to that of the driving shaft.

Instead of constructing the pump and rotor in two sections, they may be constructed each in three sections, or if desired in four or more than four sections with the working spaces of the pump and of the motor spaced symmetrically with respect to the driving shaft and the driven sleeve as the case may be, one section of each pump being connected to one section of each motor so that the number of fluid circuits is the same as the number of pump or motor sections.

What I claim then is:

1. Fluid transmission apparatus, comprising a rotary pump unit and a rotary motor unit, a housing for said units, each of said units comprising a pair of cylindrical rotors, stators extending annularly around each of said rotors, said stators and rotors being each arranged side by side, said rotors being mounted for rotation about a common axis, said pump and motor rotors being respectively adapted for association with a common driving and a common driven member, said pump stators having each a fluid suction and a fluid delivery port arranged at opposite sides thereof and adapted respectively to supply fluid to and to discharge fluid from opposite sides of the corresponding pump rotor, said motor stators having each a fluid inlet and a fluid exhaust port arranged at opposite sides thereof and adapted respectively to supply fluid to and to discharge fluid from opposite sides of the corresponding motor rotors, each suction and inlet port being arranged adjacent a delivery and exhaust port respectively, said apparatus having a pair of suction and a pair of pressure passages connecting each respectively one of the exhaust ports of the motor to one of the suction ports of the pump, and one of the delivery ports of the pump to one of the inlet ports of the motor, a fluid reservoir, means for admitting fluid from said reservoir to each of said suction passages, each of said cylindrical rotors having a plurality of vane housings, vanes disposed in said housings and movable outwardly thereof into co-operative engagement with the adjacent stator, said pump stators being each movable bodily relative to the housing and their respective rotors in a direction transverse to the direction of rotation of the latter and in a direction transverse to their said suction and delivery ports, means for bodily moving said two pump stators simultaneously in opposite directions relative to their rotors and said housing, and means for maintaining said pump and motor vanes in co-operative engagement with their corresponding stators during the continued rotation of their rotors and for various positions of said movable pump stators.

2. In fluid transmission apparatus, a rotary pump unit and a rotary motor unit, each of said units having a pair of working sections, each of said sections having a supply and a discharge port for supplying fluid thereto and for discharging it therefrom, said apparatus having passages connecting independently and separately the supply port of each unit to a respective discharge port of the other unit, a fluid reservoir, means for admitting fluid from said reservoir to each of the passages connecting said motor discharge ports to said pump supply ports, the two sections of one of said units comprising each a stator and a rotor, the stators and rotors of said latter unit being arranged side by side adjacent one another with said rotors rotatable together about a common axis, the ports of the sections of said latter unit being arranged at opposite sides of their respective rotors, the supply ports of each of the said two rotors being disposed respectively adjacent the discharge port of the adjacent rotor, the rotors of said latter unit having vanes movable bodily in relation to said rotors and adapted for co-operative engagement with the corresponding stator, said stators being adapted in co-operation with their corresponding vanes and for equal angular movements of the latter to produce substantially equal changes in fluid head, said stators being movable bodily relative to their corresponding rotors to vary the volumes swept out by the rotor vanes for a given angular movement of the rotors, and means for bodily moving each of said stators simultaneously through substantially equal distances relative to their corresponding rotors.

3. Fluid transmission apparatus, comprising a rotary pump unit and a rotary motor unit, a housing for said units, each of said units comprising a pair of cylindrical rotors, stators extending annularly around each of said rotors, said stators and rotors being each arranged side by side, said rotors being mounted for rotation about a common axis, said pump and motor rotors being respectively adapted for association with a common driving and a common driven member, said pump stators having each a fluid suction and a fluid delivery port arranged at opposite sides thereof and adapted respectively to supply fluid to and to discharge fluid from opposite sides of the corresponding pump rotor, said motor stators having each a fluid inlet and a fluid exhaust port arranged at opposite sides thereof and adapted respectively to supply fluid to and to discharge fluid from opposite sides of the corresponding motor rotors, each suction and inlet port being arranged adjacent a delivery and exhaust port respectively, said apparatus having a pair of suction and a pair of pressure passages connecting each respectively one of the exhaust ports of the motor to one of the suction ports of the pump, and one of the delivery ports of the pump to one of the inlet ports of the motor, a fluid reservoir, means for admitting fluid from said reservoir to each of said suction passages, each of said cylindrical rotors having at their peripheries a plurality of recesses extending substantially in the direction of their axes of rotation, vanes of substantially cylindrical form rotatable in said recesses, said vanes being movable inwardly and outwardly in relation to said recesses and being adapted for rolling engagement with the adjacent stator, said pump stators being each movable bodily relative to the housing and their respective rotors in a direction transverse to the direction of rotation of the latter and in a direction transverse to their said suction and delivery ports, means for bodily moving said two pump stators simultaneously in opposite directions relative to their rotors and said housing, each of said rotors having passages extending therethrough and connecting the bases of the vane recesses of the rotor, and means for maintaining said pump and motor vanes in rolling engagement with their corresponding stators during the continued rotation of their rotors and for various positions of said movable pump stators.

EDWARD EWART GUINNESS.